ARTICLE SPACING SYSTEM
Arthur J. Griner, Wyckoff, N.J. assignor to National
Biscuit Company, a corporation of New Jersey
Filed Mar. 25, 1964, Ser. No. 354,602
23 Claims. (Cl. 198—34)

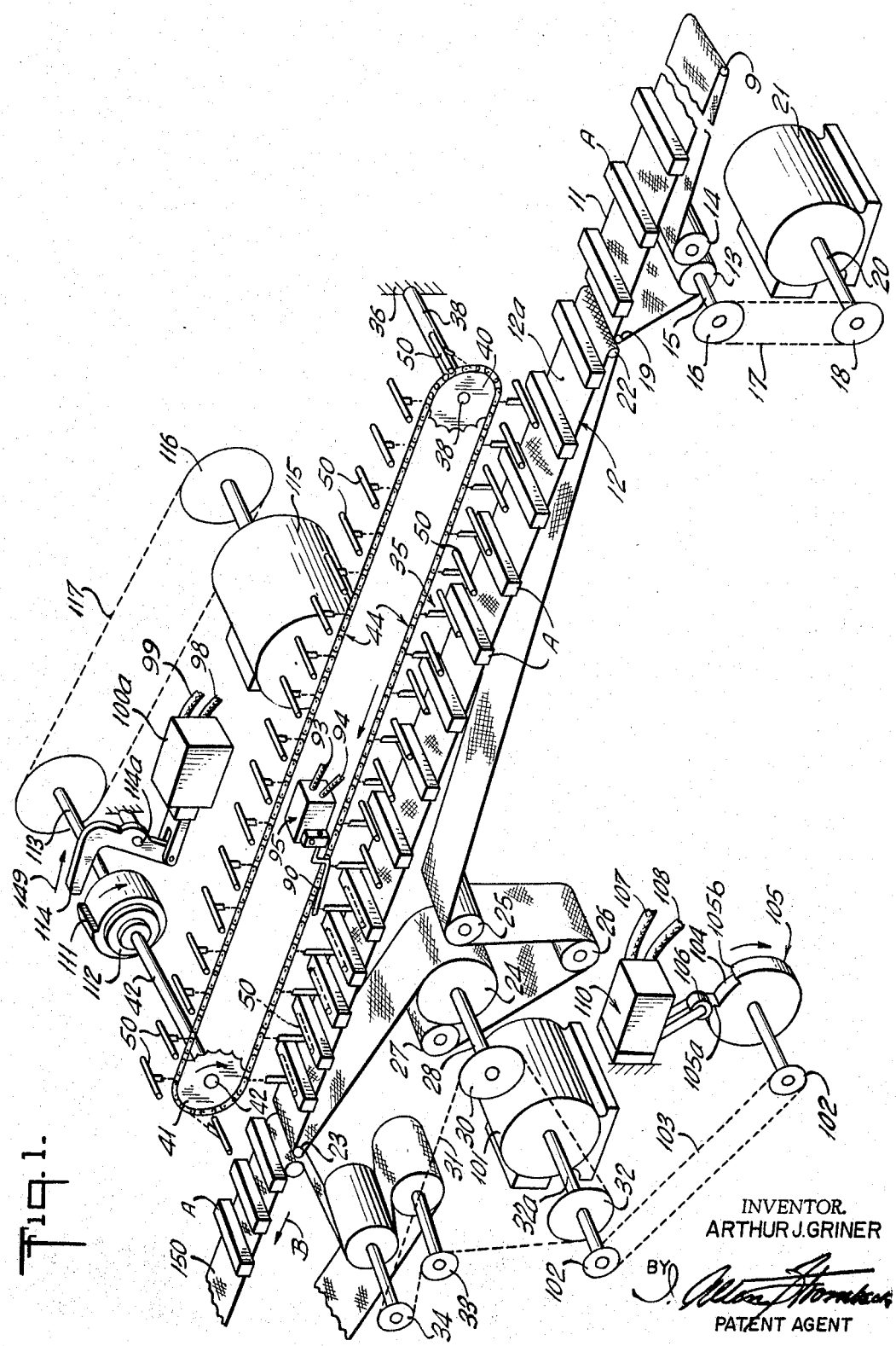

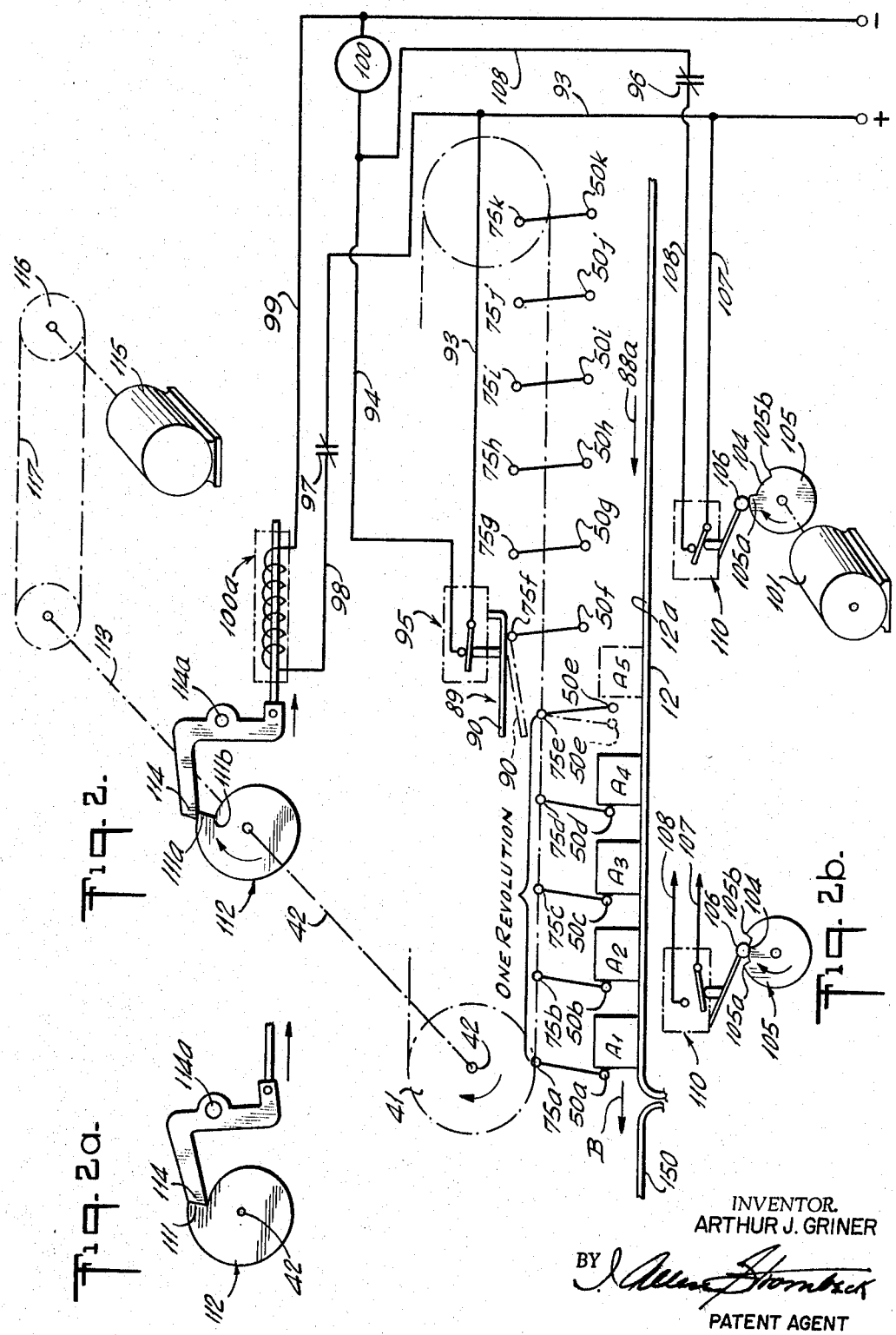

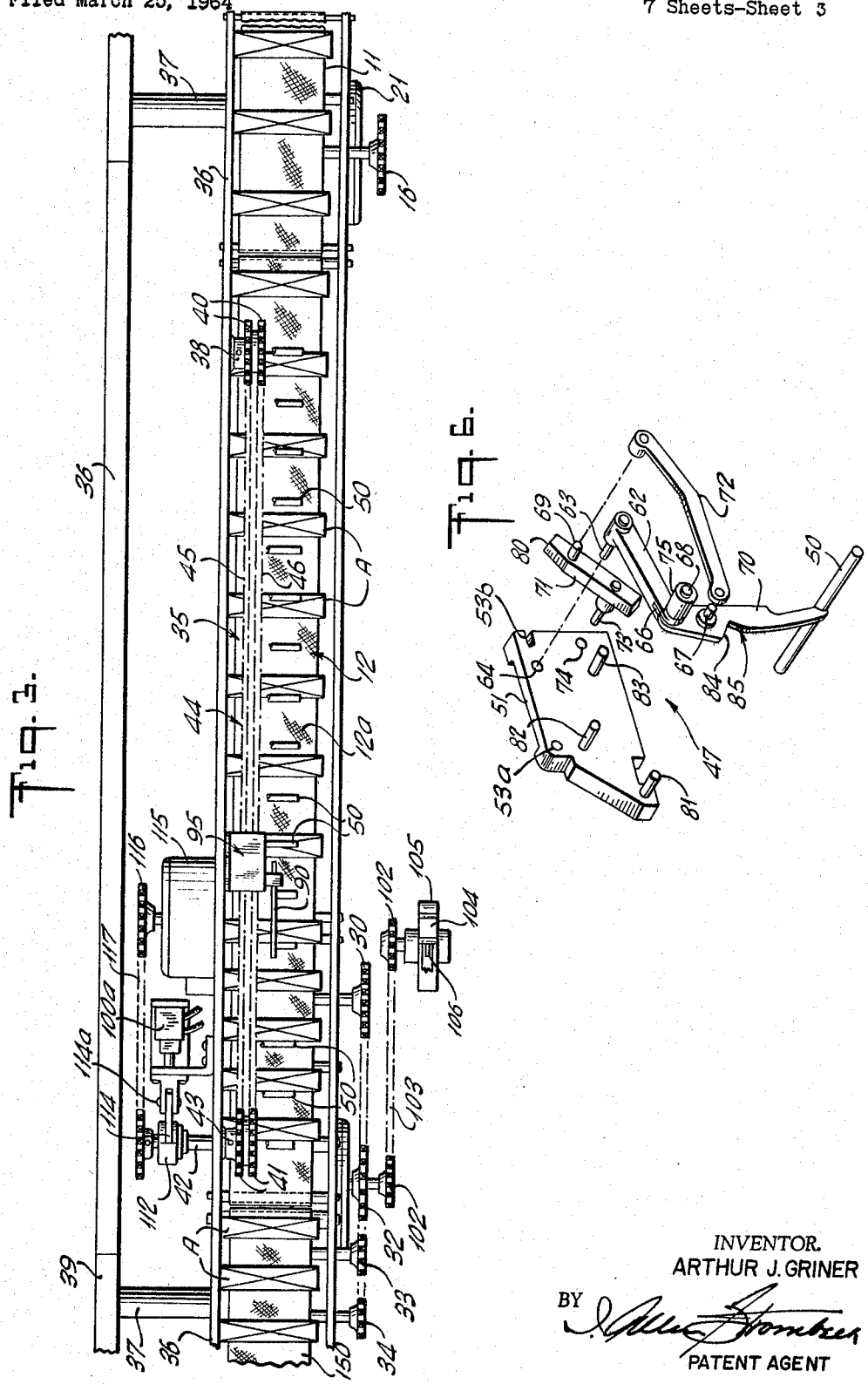

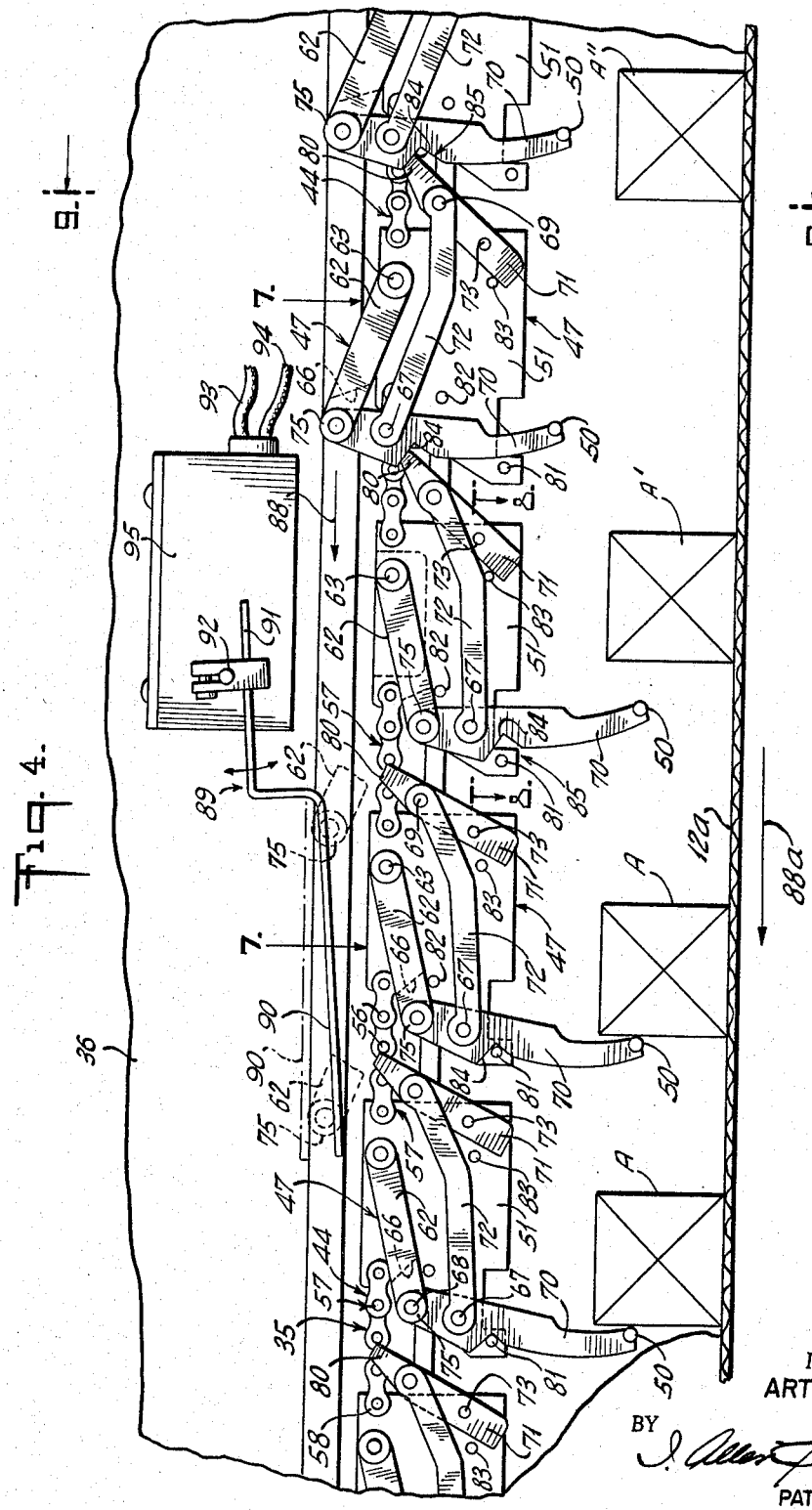

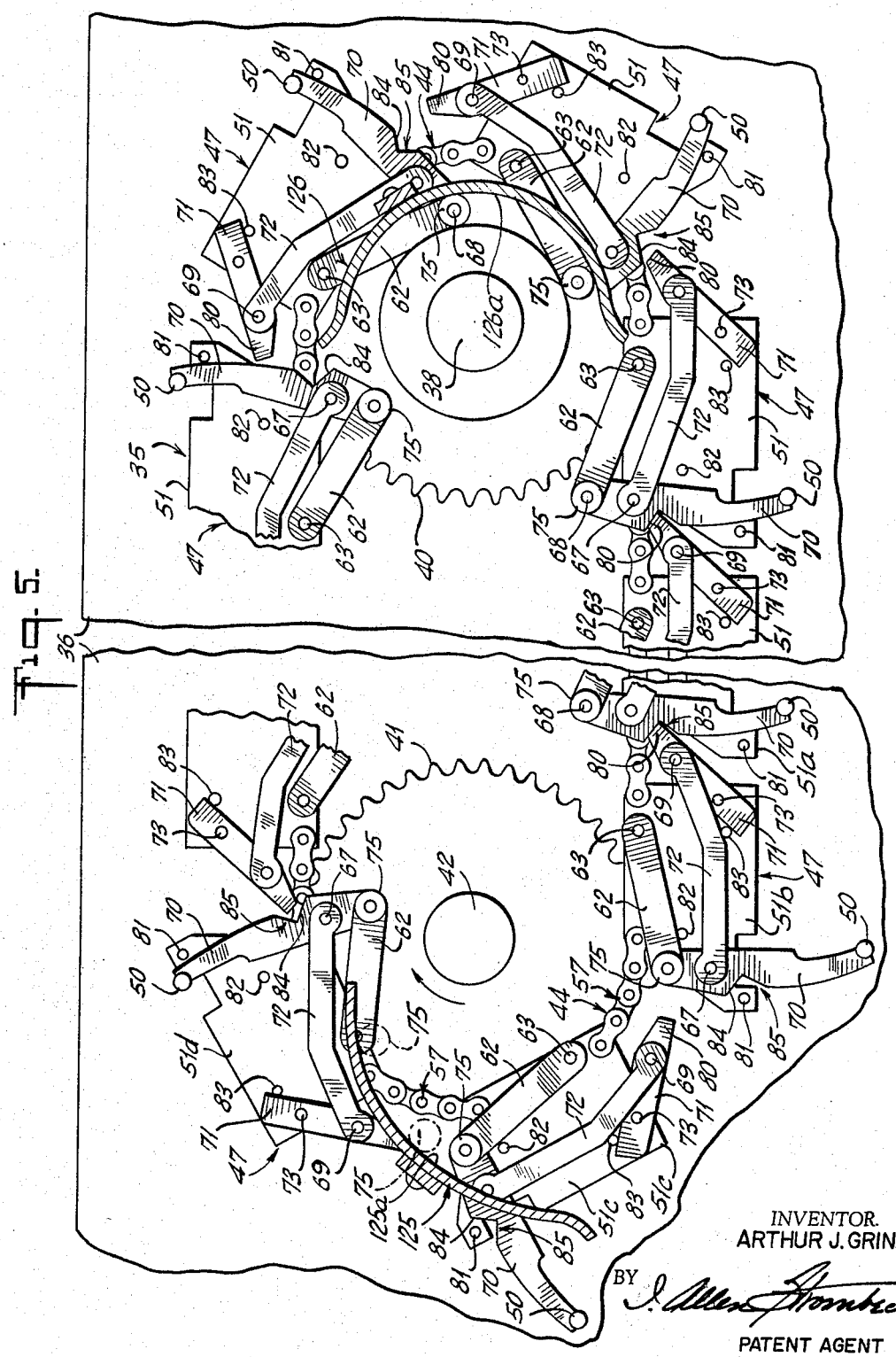

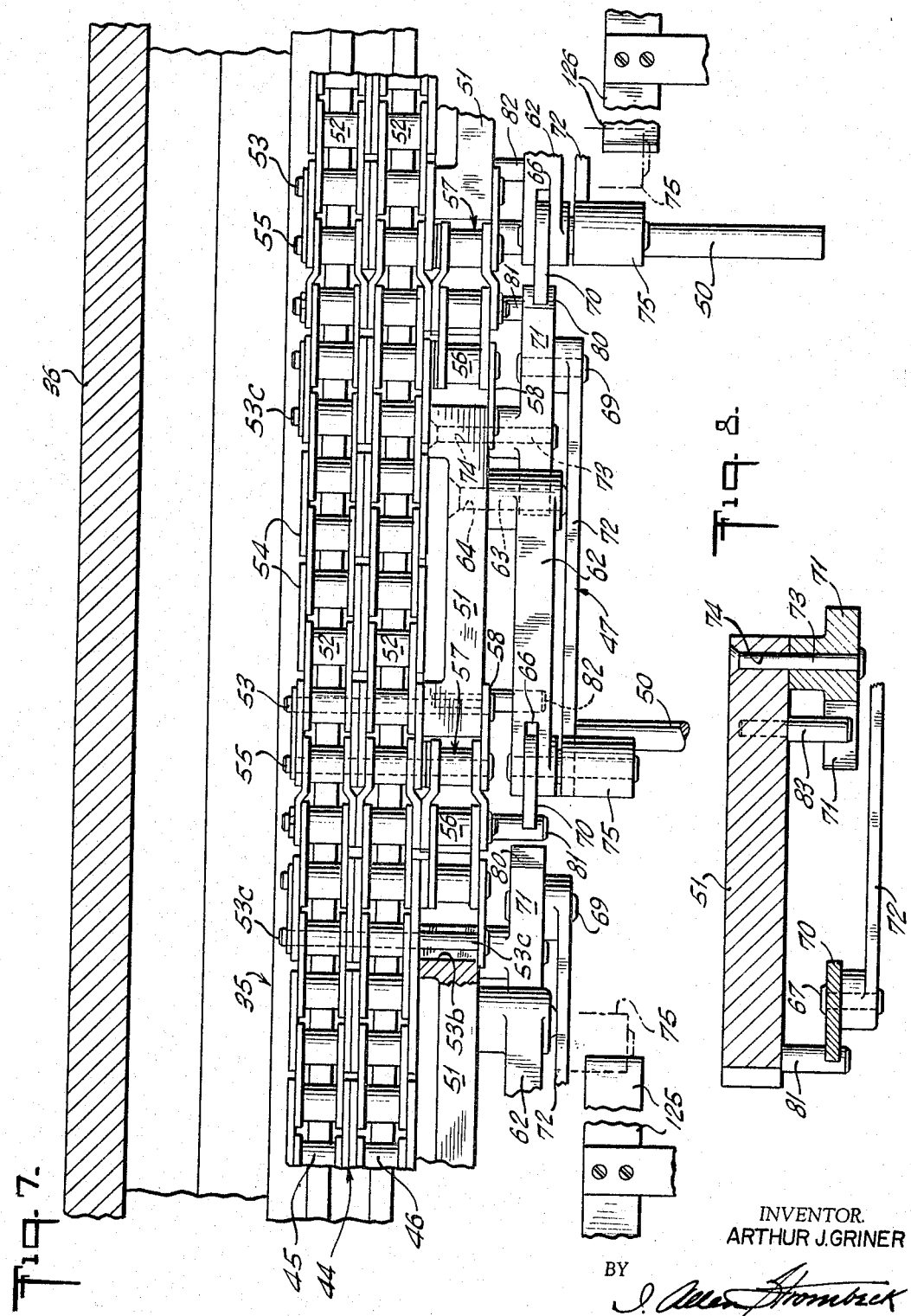

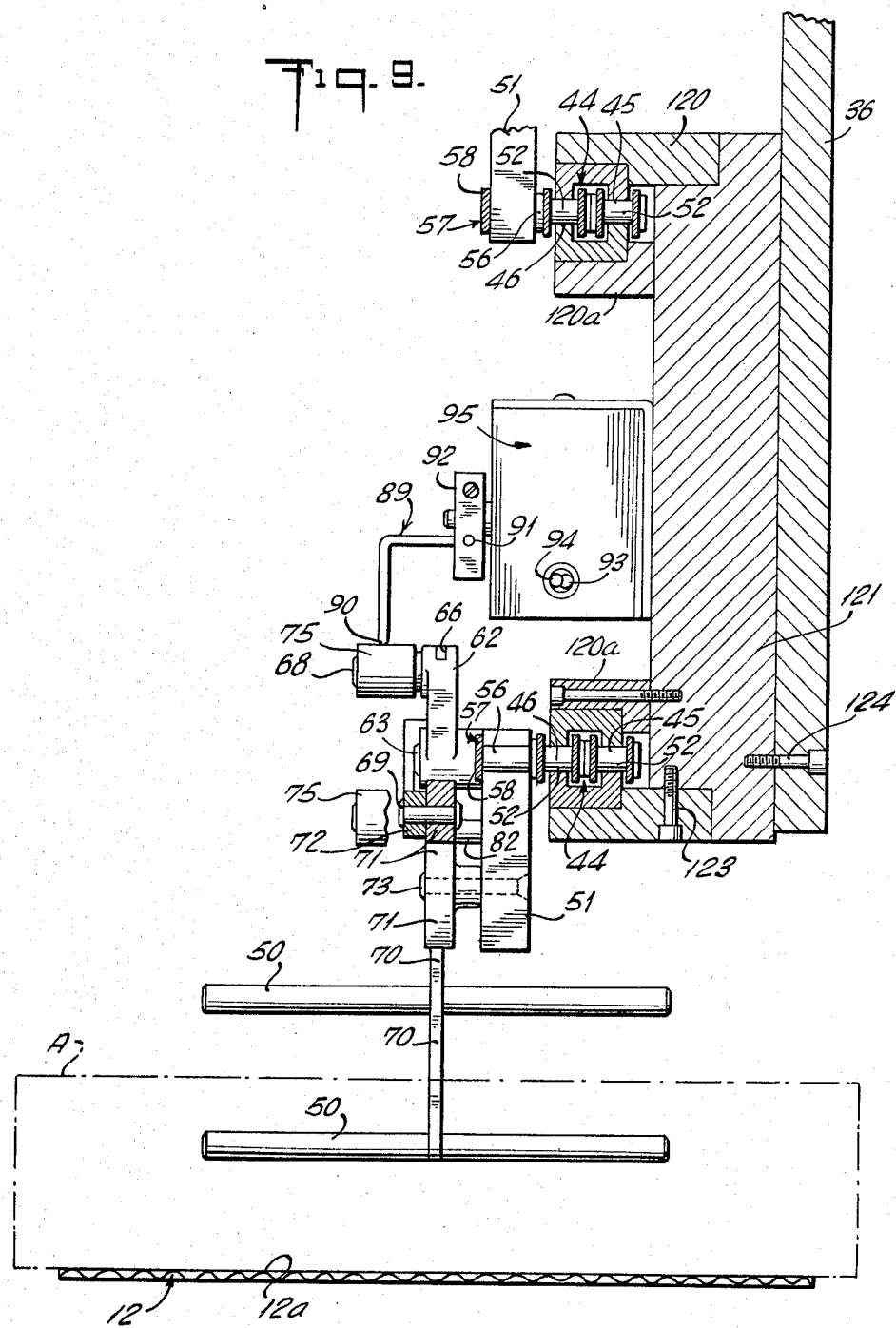

The present invention relates to improvements in method and means for article feeding and spacing, and more particularly to means for automatically establishing a predetermined distance between moving articles or packages received in a random manner or in inconsistent spacing arrangement.

In the baking industry it is often found necessary to fill containers with a particular number, rather than with a particular weight, extent or volume of articles. With this method, modern high speed packaging requires a continuous flow of equally spaced articles such as, for example, in the packaging of shredded wheat biscuits; in cartoning wrapped groups of cookies and crackers forming fractional units for insertion into semirigid containers and cartons; and in metering and loading cellophane bags with pretzels, creme sandwich cookies and other edible articles. In this respect the invention lends itself to adaptation for spacing and feeding of a wide variety of articles including wrapped and unwrapped bakery products, such as shredded wheat biscuits, pretzels, cookies, cakes and particularly fractional units of wrapped saltine crackers.

The invention has as one of its primary objects to provide means assisting in overcoming the drawbacks in operation and disadvantages encountered in the construction of article spacing apparatus, so that such apparatus becomes highly accurate in function and increases the marketability thereof in view of the remarkable speed and control, which such novel apparatus permits.

It is also an object of the present invention to provide means contributing to a novel and highly efficient construction of apparatus for spacing and timing a continuous series of moving articles, packages or similar units.

Another object of the invention is to provide means ensuring the operation of an economical and time saving spacing and feeding apparatus for handling frangible bakery products without damage thereto.

Still another object of the invention is to provide means resulting in an article spacing and feeding apparatus of novel design into which may be fed units of wrapped biscuits arriving thereat at random or in irregular order.

A further object of the invention is to provide means facilitating automatically and continuously spacing a moving column of randomly oriented articles.

A still further object of the invention is to provide means affording automatic detection and control of errors in the quantity of articles fed, thereby to eliminate human errors normally encountered in manual packaging of articles of the type herein exemplified.

An important object of this invention is also to provide means implementing a single compact article spacing mechanism, in which mechanical and electrical components thereof are functionally related with respect to the timed functions of associated apparatus.

Yet another object of the invention is to provide means redounding to a fast-acting and continuous method for equidistantly spacing and delivering products to a station for further handling, thereby to achieve great uniformity in salable packages and the like.

A further object of the invention is to provide means conducive to a greatly simplified and efficacious article spacing apparatus for delivering a continuous series of equidistantly grouped articles to a cartoning and like machine with the assurance that groups of any selected number of such articles may completely fill respective cartons and like enclosures in order to prevent formation of slack-filled cartons and the like, which would contain only an improper and undesirable count of articles.

These and further objects and novel features of the present invention will more fully appear from the following description when the same is read in connection with the accompanying drawings. It is to be expressly understood, however, that the drawings are for the purpose of illustration only and are not intended as defining any limits of the invention.

In the drawings, wherein like reference characters refer to like parts throughout the several views:

FIGURE 1 is a general and diagrammatic view somewhat in perspective, of an apparatus constructed in accordance with the present invention;

FIGURE 2 elucidates schematically the operation of the apparatus of FIGURE 1;

FIGURES 2a and 2b show specific positions of certain parts seen in FIGURE 2, to which reference is made in the specification;

FIGURE 3 is a top plan view of the apparatus shown in FIGURE 1;

FIGURE 4 is an enlarged fragmentary detail side elevational view of the flight or spacing conveyer and article supporting conveyer seen in FIGURE 1;

FIGURE 5 is a fragmentary view in side elevation of the spacing conveyer showing end sprockets and flight assemblies with the conveyer chain and guide cam plates seen in section;

FIGURE 6 is an exploded view of the components of one of the flight assemblies shown in FIGURE 5;

FIGURE 7 is a fragmentary and enlarged detail plan view of a group of conveyer flight assemblies taken on line 7—7 of FIGURE 4, as supported by a guide track and a multistrand roller chain;

FIGURE 8 is a longitudinal section of the mounting plate and bars supported thereon, taken on the line 8—8 of FIGURE 4; and FIGURE 9 is an end view partially in section taken on line 9—9 of FIGURE 4.

Although the present invention is hereinafter described primarily in connection with equidistantly spacing of packaged or wrapped units of saltine crackers, it will be understood that any packages and articles, and especially unwrapped bakery products, as for example, shredded wheat biscuits, rusks, cookies, and pretzels, or similar products, may be handled by the novel apparatus which will be found to operate very satisfactorily, speedily and without disturbances.

Referring now more specifically to the drawings there has been disclosed a plant or apparatus for carrying the invention into effect.

*Infeed conveyer*

In accordance with the invention, an endless traveling belt 12 (FIGURES 1, 2 and 3) is coupled in receiving relation with an endless infeed belt 11 carrying articles A which are, as in the present embodiment, wrapped units of saltine crackers discharged from a wrapping machine. The invention, nevertheless, will function however with a variety of other objects, packages or cartons. Means for driving belt 11 is provided by a drive pulley 13, whereas idler 14 takes up the slack in belt 11. The drive pulley 13 is secured to a shaft 15 which is driven by a sprocket 16. An endless sprocket chain 17 is passed about sprocket 18 secured to the motor shaft 20 of the motor 21. The upper horizontal run of the infeed belt 11 is supported on idler rollers 9 and 19.

Directly in the path of the advancing infeed belt 11 there is provided a spacing belt 12 for receiving the aforesaid articles A arriving from belt 11. Belt 12 is passed over two idler pulleys 22, 23 providing a clear stretch or runway 12a on which the spacing operation is effected. Belt 12 is driven by a drive pulley 24 and a set of three idlers 25, 26 and 27 is provided to take up the slack of belt 12, thereby to increase traction of the drive pulley 24. A shaft 28 is keyed to the drive pulley 24. A sprocket 30 is secured to the shaft 28. The belt 12 is driven at a linearly faster rate than its preceding belt 11. The net effect of linear speed increase of belt 12 over belt 11 is a substantial increase in spacing between each successive article A, as it is transferred from belt 11 to belt 12.

Driving connections for rotating the sprocket 30 is provided by an endless sprocket chain 31 which is passed about the sprocket 30 extending to and about motor sprocket 32, as well as sprockets 33 and 34. Sprocket 32 is fastened to shaft 32a of motor 101, which also drives via sprockets 102 and chain 103 reset cam 105. Reset cam 105 is provided with a notch or dwell 104 for coaction with cam follower 106 as later explained.

Spacing mechanism

Referring to FIGURES 1, 2 and 3, there is shown a spacing mechanism comprising an overhead flight conveyer 35 provided to cooperate with product or package transporting belt 12. To support the overhead flight conveyer 35 above the underlying belt 12, there is provided a back frame plate 36 supported by framing members 37 (FIGURE 3) which are fastened to a base frame 39. At the entrance or delivery end of the overhead flight conveyer 35 a fixed stub shaft 38 (FIGURE 1) is provided for mounting a double chain sprocket 40 for rotation thereon. At the discharge end of the flight conveyer 35 a double chain sprocket 41 is keyed to a shaft 42 revolvably mounted in a suitably supported journal 43 (FIGURE 3). About the sprockets 40 and 41 a multiple sprocket chain 44 which comprises parallel roller chains 45 and 46, is mounted for clockwise travel (see FIGURES 7 and 9).

The sprocket chain 44, in mesh with sprockets 40–41, carries a series of aligned and equidistantly spaced article-segregating vanes or flights 47 (see FIGURES 2, 4, 5, 6, 7, 8 and 9) each of which is releasable from an upper inoperative and locking position (when traveling along the lower stretch of chain 44) to drop its respective flight element 50 into operative and article-segregating position directly over the underlying conveyer 12, as later set forth. Each flight assembly 47, as best seen in the exploded view of its component parts (FIGURE 6) comprises a mounting plate 51 pivotally secured at intervening spaces to the flight chain 44.

As previously described, the flight chain 44 is comprised of two sprocket chains 45 and 46 (FIGURE 7) each of which is formed with a series of rollers 52 mounted in parallel and pivotally carried on pins or shafts 53 extending transversely through both chains and connected together by means of link plates 54. Referring to FIGURES 4, 5 and particularly FIGURE 7, chains 45 and 46 are formed with groups of six parallel rollers 52 alternating with groups of three rollers, the rollers of the latter group of which are mounted on extra long shafts 55. Each of the longer shafts carries a third roller 56, thus providing a third chain 57 integrally mounted in parallel with chains 45 and 46 at equidistant intervals of six rollers 52. Each end roller 56 of the groups forming chain 57 is provided with a link plate 58 provided for carrying a flight element mounting plate 51 at the intervening space between each group of three rollers.

Each mounting plate 51 of the flight assembly 47 carries a plurality of components consisting of flight element 50 attached to a pusher bar 70, which, in turn, is linked by means of a yoke and pin arrangement 66, 68 to upper tie bar 62. Lower tie bar 72 is pivoted at one end to a stud 67 on pusher bar 70 and at the other end on a stud 69 provided on a latch bar 71. This latch bar is swingably supported by a stud 73 engaged in a bore 74 of the mounting plate 51. Upper tie bar 62 is further carried by plate 51 for pivotal movement by means of pin and hole connection 63, 64. The aforesaid pin or bolt 68 rotatably carries a roller 75 for a purpose hereinafter explained. Pusher rod or bar 70 via upper tie bar 62 is pivotally supported on plate 51 and latch bar 71 is operatively connected via lower tire bar 72 to pusher bar 70. Latch bar 71 has a reduced end surface 80, to which reference is made later on. Mounting plate 51 is further equipped with stop pins 81, 82 and 83 as more clearly seen in FIGURE 4.

It will be observed that pusher bar 70 is provided with an angular-shaped slit or kerf 85 as shown, which is defined by a surface portion 84 engageable in inoperative position by reduced end face 80 of a preceding latch bar 71 and disengaged from it in operative position, as will be explained further below. During the operative position the preceding latch bar 71 is adapted to pivot by means of stud 73 relative to mounting plate 51 for a purpose referred to. As a consequence of the disengagement of latch bar 71 at 80 from the respective kerf surface portion 84 of a succeeding pusher bar 70 the latter is free to swing and to assume a position, in which the kerf 85 comes to finally engage stop pin 81, as shown on the left-hand side of FIGURE 4. To arrive at this latter position latch bar 71 has carried out a pivotal movement about stud 73, while lower tie bar 72 moves about stud 69 and the respective flight element 50 assumes a position to take up the impact of an oncoming respective object A, e.g., package, biscuit and the like by which the final swinging movement of latch bar 71 is controlled.

During the aforedescribed movement of latch bar 71, upper tie bar 62 comes to rest on stop pin 82 prior to the release of the latch bar 71 from surface portion 84 as is well apparent from FIGURE 4.

FIGURE 5 reveals in greater detail the engagement of the sprocket chain 44 with respect to end sprockets 40, 41 and the relative positions of the aforesaid component parts of the flight assembly 47 carried by each mounting plate 51, whereby through gravity and linkage interaction (interlock and release) of said component parts with respect to each other their relative location to corresponding mounting plates becomes quite evident.

Referring further to FIGURES 4, 6 and 9 it ensues from the aforesaid disclosure, that stops 81, 82 and 83 are located on each mounting plate 51, so that in the effective or operative position of flight element 50 (when same is in contact with and located ahead of article A) stop 81 is in engagement with surface portion 84 of kerf 85 of the corresponding pusher bar 70, while upper tie bar 62 is retained in position through stop 82, whereas latch bar 71 is freed from stop 83 (compare various inoperative, semioperative and fully operative positions of flight elements 50 with respect to articles A″, A′ and A in FIGURE 4).

It is to be noted, that normally when articles A are advanced by transporting conveyer 12 at a speed of at least twice the speed of spacing or flight conveyer 35 in the direction of arrow 88a (FIGURES 2 and 4) respective flight elements 50 of the equally spaced flight assemblies 47 will be successively engaged, when in semi-operative position (full line position 50e in FIGURE 2) under preselected force or impact of an article of predetermined weight and size, so that such flight elements 50 assume their operative positions (see full line positions 50a to 50d and dotted line position 50e), in which the contacting articles A (A1 to A4 in FIGURE 2) become equally spaced and grouped with respect to each other on conveyer belt surface 12a to which they were initially delivered from belt 11 at random and preferably deposited at much larger distances from each other.

FIGURE 4 indicates at the left-hand side how articles A have engaged two left-hand flight elements 50, whereas articles A′ and A″ approach their respective flight elements which are still in semioperative and inoperative positions, respectively. Only after article A' on conveyer belt surface 12a strikes its coordinated flight element 50, will the respective gate forming bar 70 be unlatched and moved to fully operative position, in which said gate bar 70 finally abuts stop 81. Flight elements 50 will be then located ahead of and in contact with article A', thereby to assume a position corresponding to the final or operative position shown by articles A in FIGURE 4. Article A" will have meanwhile arrived at a location with respect to the succeeding flight element 50 as the latter is depicted in its position relative to article A' (FIG. 4).

FIGURE 4 indicates the operation of a micro-switch 95 via switch arm 90 by means of one or two consecutive rollers 75 (shown in dotted lines) of two gate bars 70 which remained in inoperative positions along a path indicated by arrow 88, to which reference will be had later on.

Reverting now to FIGURE 5 the sprocket chain system 44 of spacing or flight conveyer 35 is trained over and moved around end sprockets 40, 41 in such a manner, that, e.g., with respect to end sprocket 41 (rotating in the direction of the arrow) mounting plate 51b will then take up a position as indicated by mounting plate 51c, as soon as a disengagement of latch bar 71 from slit 85 of gate bar 70 on mounting plate 51a takes place. As a consequence thereof the latter gate bar with its roller 75 will drop by gravity and/or by means of a trip cam (now shown) to its lower semioperative position as indicated by the position of mounting plate 51b, whereas the linked bars 70, 71 and 72, 62 on the latter plate assume automatically and successively positions as indicated in FIGURE 5. The further displacement of these bars is primarily conditioned upon cam plate means 125. Gravitational actuation of the aforesaid bars is limited by suitable location of stop pins 81, 82, 83 on the mounting plates, as is well apparent from the above description and FIGURES 4 and 6. Thus bar 62 abuts stop 82; latch bar 71 abuts stop 83 and gate bar 70 comes to engage stop 81 in predetermined positions of said bars.

Cam plate means 125 is suitably mounted and may form a portion of a lateral protective cover plate (not shown) for the sprocket arrangement 41.

The shape of cam plate means 125 is so chosen that it directs the rollers 75 and functions as a guide along the inner cam path 125a for the rollers of the successive flight assemblies 47 (indicated in dotted lines adjacent sprocket 41) and positively causes the interlocking or latching engagement of latch bar 71 of a preceding flight assembly with the walls of slit 85 of the succeeding flight assembly for and along the upper run of the spacing conveyer, as depicted in the upper left-hand part of conveyer 35 at the location of sprocket 41 (FIGURE 5).

The right-hand side of FIGURE 5 clearly demonstrates the coordinated relationship of the linked bars 70, 71 and 72, 62 and the orderly and systematic positions of rollers 75 along guide or cam plate 126 extending adjacent sprocket 40 as shown. The pivotal movement of said bars forces the latter to maintain a final interconnection with one another by the insertion of the respective reduced ends 80 of latch bars 71 into the corresponding angular slits 85 of succeeding gate bars of the flight assemblies.

Cam plate 126 similar to the aforementioned cam plate 125 may likewise form a portion of a lateral protective cover plate (not shown) for this sprocket arrangement 40. As will be observed from the shape of cam plate 126 the same is engaged along its inner curved guide surface 126a by rollers 75 of successive flight assemblies, so that at the zone of the spacing conveyer (near the location of sprocket 40) rollers 75 and the respective bars 70, 71, 72 and 62 are positively guided to maintain their inoperative positions (see lower left-hand position of flight assemblies 47 below sprocket 40 in FIGURE 5 and right-hand position of these flight assemblies in FIGURE 4).

Thus automatic and positive disposition of the flight assemblies along upper and lower runs of the spacing conveyer, as well as their movement about sprockets 40, 41 is achieved without reducing the conveyer speed along a substantially noiselessly performed course.

The mounting plates 51 associated with the chain drive are recessed in the chains as seen, in particular, in FIGURE 7 and are supported by shafts 53 in openings 53a and by shafts 53c in slots 53b to follow the movement of the chain. Guide plates 120, 120a support the chain system 44, 57 along the lower, as well as on the upper run (FIGURES 5 and 9). These guide plates for the sprocket chains are affixed to a support plate 121 by means of screw bolts 123, said support plate 121, in turn, being mounted on frame 36 at 124. The mentioned linked bars on the mounting plates 51 are made of any suitable material, such as reinforced plastic material, light weight metal and the like, whereby wear and noise of these component parts are kept at a minimum.

It is well understood that the linkage principle herein disclosed, the shape of the component parts and their inter-engaging action, guidance and release may be had in any other manner suitable for the purpose, for which the apparatus will be put to use. The flight elements 50 may be made adjustable in height or level with respect to their gate bars to which they extend in this example, at right angles, or the gate bars may be varied or changed for height adjustment (e.g., by bolt and slot arrangement or by relative displacement of the spacing conveyer 35 with respect to the article transporting or belt conveyer 12) in order to facilitate equidistantly spacing of shredded wheat biscuits or of any other articles of relatively reduced height. The gate members or bars 70 controlling the effective location of the flight elements 50 may be operatively and permanently interconnected by suitably shaped latching devices, as is well understood. It is further proposed according to the invention that, when all gate bars 70 are still in inoperative position during their travel, a respective gate bar 70, when the same arrives at sprocket 41 (approximately below, but somewhat ahead of the center of said sprocket) may be tripped by a cam (not shown) which is disposed near such extreme location, thereby to positively and automatically trip the respective flight element into a semioperative position for coaction with an oncoming package or article. It is, of course, understood that presetting of such flight element can also be had through gravitation and like action as herein above referred to.

*Operation of spacing mechanism*

In order to understand function and result accomplished by the new spacing conveyer system 35 operation of its mechanism will be hereinafter explained.

As seen in FIGURE 2 there is schematically disclosed the position of arm 90 of microswitch 95 which may be adjusted as to its location along a predetermined path relative to belt conveyer 12 for the engagement of rollers $75a$ to $75f$, etc., of corresponding flight elements $50a$ to $50f$ etc. There are also diagrammatically indicated the positions of these flight elements with respect to end sprocket 41, as well as the electrical and mechanical set up of synchronous motor drives 115 and 101 together with their clutch and pawl mechanism 112 and 114 and with their cam and follower means 105, 106, respectively (FIGURES 2a, 2b).

Let it be assumed that articles or packages $A_1$, $A_2$, $A_3$ and $A_4$ on transporting conveyer 12 were fed for impingement upon flight elements $50a$, $50b$, $50c$ and $50d$ successively and have displaced the same to fully operative positions due to exertion of corresponding impact thereagainst. As a consequence thereof flight element 50e has been tripped or was released from its inoperative to semioperative position as hereinabove explained, whereafter flight element 50f still in its retracted or inoperative position comes to engage by means of roller 75f switch arm 90 to operate its switch. It will be observed that the adjustable position of switch 95 with switch arm 90 has been selected in this instance, to clear always four equidistantly located packages or articles on transporting or belt conveyer 12 by means of spacing conveyer 35.

As a consequence, bell crank-shaped and spring-loaded pawl 114 assumes a position 111a on the peripheral surface above jaw or tooth 111 of clutch 112 as shown. When switch 95 was operated by means of roller 75f relay 100 became energized via conductors 93, 94. The respective closed (normally open) relay contacts 97 of relay 100 are then placed into the circuit through conductors 98, 99 and coil of solenoid 100a actuates pawl 114 by moving same about pivot 114a to the mentioned position 111a.

Simultaneously relay contacts 96 (normally open) are closed in circuits 107, 108 which is controlled by continuously driven cam 105, which operates by follower 106 a switch 110. This latter switch is intermittently opened and closed and acts on the relay holding circuit via contacts 96 to relay 100, as is quite apparent.

While, in the instance shown, pawl 114 contacts peripheral surface of rotating clutch element 112 and glides thereon from location 111a to location 111b, one complete cycle or revolution of clutch element 112 is thereby carried out, so that pawl 114 engages finally tooth 111 at location 111b (FIG. 2a). During this one revolution of clutch element 112 sprocket 41 will be rotated to an extent sufficient to forwardly move the four packages $A_1$ to $A_4$ to discharge station B onto belt 150 (see arrow). During this forward movement of flight elements 50a to 50d, flight element 50e while still in semioperative position, will assume an extreme location relative to sprocket 41, which location is approximately determined by the position taken up by flight element 50a, as shown.

In other words, during the aforesaid one cycle or clutch revolution flight element 50e moves from its position as seen in FIG. 2, to a position which was previously taken up by flight element 50a.

During this latter advance movement of flight 50e, the remaining flights 50f, 50g, etc., are still detained in their inoperative positions with their rollers 75f, 75g, etc., in subsequent contact with and moving past switch arm 90 (arrow 88 in FIGURE 4) until flight element 50e has reached its aforesaid extreme location, in which one of the subsequent rollers, say 75k, effectively operates switch arm 90 for stopping spacing conveyer 35.

This stoppage of movement of conveyer 35 is achieved when after the aforesaid single clutch revolution pawl 114 engages tooth 111 and thus causes declutching of shaft 42 of sprocket 41 from continuously driven motor shaft 113, which continuous rotation will, however, be maintained by motor 115.

During this stoppage of conveyer 35 continuously driven cam 105 has rotated from a position 105a in contact with switch follower 106 to a position 105b (FIG. 2b) thereby completing also an entire cycle or revolution, at the end of which follower 106 enters cam dwell 104 and opens the aforesaid relay holding circuit via contacts 96 to relay 100 and also the circuit via contacts 97 and solenoid coil 100a, which deactuates pawl 114. Opening of contacts 97 causes withdrawal of spring-loaded pawl 114 from engagement with tooth or jaw 111 under spring action. Resetting the position of pawl 114 in synchronism and conformity with the position of roll 106 in dwell 104 is thus had for renewed and continued operation of the apparatus. Further packages then advanced, will successively exert their impact on flight elements 50e, 50f, 50g, 50h, etc., which are tripped one after the other from their inoperative to their fully operative positions.

Let it now be assumed that the delivery of further packages on conveyer band 12 was stopped for any reason and that flight element 50e remained in semioperative position and had reached its aforesaid extreme left-hand location near sprocket 41.

Only after package $A_5$ (indicated in dotted lines) has been urged into contact with flight element 50e will succeeding flight element 50f assume semioperative position and after the latter has been impacted by a subsequent package (not shown) arriving on conveyer belt 12, will packages hereafter delivered cooperate with successive flight elements 50g, 50h, 50i, 50k, etc., whereupon four equidistantly spaced packages will be continuously discharged in timed relation and at proper sequence from belt 12 onto belt or band 150 as above explained.

Suppose that only three packages $A_1$ to $A_3$ had arrived at corresponding flight elements 50a to 50c of the respective gate bars, but package $A_4$ had not as yet operated flight element 50d (which is now in semi-operative position due to tipping and fully operative position of preceding flight element 50c). In such case pawl 114 will still remain in its locked position 111b behind clutch toothed 111 until further packages $A_4$ and eventually $A_5$ have arrived at and had their impact on flight elements 50d and 50e and have tripped same to fully operative position, whereupon flight element 50f will move to semioperative position and releases switch arm 90 for further continuous operation of spacing conveyor 35 as above explained.

As seen in FIGURES 2 and 4 sensing arm 90 forms one end of a bar 89, whose opposite end 91 is attached to an actuator 92 of a micro-switch 95 of known construction. As stated this switch 95 is connected in circuit via conductors 93, 94 to relay unit 100 having normally open contacts 96 and 97. Contacts 97 are connectable to the power line via solenoid coil 100a which operates the spring-loaded clutch pawl 114, whereas contacts 96 are included in a relay holding circuit, which is controlled by switch 110, which is operated by cam 105.

Since motor 101 is connected via sprocket and chain 102, 103 to the mentioned continuously driven reset cam 105 provided with a dwell 104, the latter together with roll 106 are adapted to actuate switch 110 for opening and closing same. Follower roll 106 remains in contact with cam surface 105 from point of contact 105a to 105b while said cam rotates at predetermined speed. During said cam rotation (see arrow) roll 106 intermittently engages dwell 104, to bring about interruption of the relay holding circuit 107, 108 to relay 100 and effectuates resetting of the operation of the spacing conveyer flight assemblies in timed relation and at the proper and predetermined sequence thereof. The ratio of the teeth of sprockets 40, 41 to each cycle or revolution of clutch element 112 (locations 105a to 105b) is predetermined in accordance with the number of packages A to be equidistantly spaced for the contemplated package grouping or counting.

As soon as packages A arrive on belt 12 (FIGURE 4) which moves continuously underneath the flight elements and slips past the packages, when the latter are in engagement with corresponding flight elements in their operative position, rotation of sprocket 41 from input shaft 113 will be continuously transmitted via clutch 112 to output shaft 42, while pawl 114 remains in inoperative or retracted position, as indicated by arrow 149 (FIGURE 1).

It is well apparent from the above disclosure that the electro-mechanical control system for the operation of the spacing conveyer 35 may be modified to adapt same to any desired number of articles or packages to be equally spaced, counted and grouped, e.g., by changing the speed and extent of the effective surfaces of the clutch 112 and/or cam 105 as well as the lengthwise position of switch arm 90 and switch 95 relative to transporting conveyer 12. Additional control systems, such as photoelectric cell means may be employed to check the advance of the aforesaid articles or packages and determine their location. The apparatus may also be equipped with a hand-operated main or emergency switch to stop and start operation of the spacing mechanism, preferably independently of the circuitry hereinabove set forth.

It ensues from this disclosure that there have been created in accordance with the invention novel means and method for equidistantly spacing articles to each other on a transporting conveyer band on which they were previously haphazardly deposited. The conveyer system includes besides the mentioned conveyer belt a spacing conveyer mechanism which is suitably spaced from and located relative to said conveyer belt and carries equally spaced plate supports for specially shaped flight elements, which are arranged for displacement with respect to said spacing conveyer and the conveyer band or belt and are adapted to cooperate with and straighten out articles, products or packages, even if by chance placed askance on said belt. Continuous motor drive means are operatively connected to said spacing conveyer via clutch means for controlling the movement of the latter conveyer.

With these clutch means cooperate actuatable means (e.g., pawl means) which is influenced by control means (microswitch and solenoid) disposed in the path of operable means (flight rollers) connected to said flight elements, which are adapted to move from an inoperative to an operative position when respective packages and the like on said conveyor belt come to engage with corresponding preceding flight elements. These flight elements will, however, remain in said inoperative position if such packages fail to arrive at said flight elements thereby to finally impede via said control means movement of said spacing conveyer.

It will be noted that even if the control means is released from contact with any operable means of said flight elements the above mentioned relay holding circuit will still be maintained for a time unit, which is needed to again synchronize respective positions of the clutch element and of the cam, so that for further advance movement of the spacing conveyer the circuit will be only opened the instant when, e.g., the cam dwell and the clutch tooth assume their respective coinciding positions. Therefore highly accurate and positively controlled operation of the above described spacing system is ensured at all times.

It will be understood by those skilled in the art that numerous variations in the above described apparatus involving substitutions of substantial equivalents for the structures described are intended to be comprehended within the spirit of the present invention and that the invention is capable of extended application and is not confined to the precise constructions illustrated nor to the order in which the steps have been described and, therefore, such changes and modifications may be made therein as do not affect the spirit and scope of the invention.

What is claimed is:

1. An apparatus for moving articles from a supply station to a packaging station comprising first conveyer means movable to carry articles randomly spaced thereon and delivered from said supply station, second conveyer means arranged to move in the same direction as and located for cooperation with said first conveyer means, and spaced apart flight means associated with said second conveyer means and arranged to move relative to each other from an inoperative to an operative position on said second conveyer means, said flight means being adapted to coact with articles advanced by said first conveyer means and being movable into the path of said articles on said first conveyer means for contact and spacing said articles thereon in said operative position, said flight means being actuatable upon contact with a respective article and being retractable to assume inoperative position upon release from contact with said article on said first conveyer means, said flight means being arranged on said second conveyer means in normally interlocking relation to each other, whereas contact with one of said articles by an operative part of one of said flight means will cause release of an operative part of another of said flight means preparatory to its contact with another of said articles on said first conveyer means.

2. An apparatus according to claim 1, including means for controlling the position of said flight means relative to said second conveyer means, and means responsive to said controlling means for regulating the movement of said second conveyer means relative to said first conveyer means.

3. An apparatus for moving articles from a delivery station to a packaging station, and having first conveyer means to movably carry said articles thereon in randomly spaced relation to each other, and having second conveyer means arranged for cooperation with said first conveyer means and movable in the same direction as the latter; comprising
   (a) flight means actuatable by said articles and associated with said second conveyer means,
   (b) mounting plate means equally spaced from each other and forming respective parts of said second conveyer means,
   (c) said flight means being pivotally supported on said mounting means, respectively, and being adapted to reach from an inoperative position into the path of said articles when placed on said first conveyer means, so that said articles on said first conveyer means actuate said flight means and release same from inoperative to article spacing positions, respectively,
   (d) and sensing means located in the path of respective portions of said flight means when in inoperative position for influencing the relative movement of both said conveyer means.

4. An apparatus according to claim 3,
   (a) said first and said second conveyer means including respective drive means,
   (b) clutch means associated with said drive means of said second conveyor means,
   (c) and means actuatable by said sensing means for activating and deactivating said clutch means.

5. An apparatus according to claim 3,
   (a) said flight means being normally lockingly interengaged and having a component part extending from one of said mounting means to an adjacent mounting means,
   (b) respective flight means having flight elements arranged for position relative to a dimension of respective articles to be equally spaced on said first conveyer means,
   (c) and means effectuating disengagement of said flight means from said articles adjacent said delivery station.

6. A system for handling wrapped and unwrapped articles, packages and similar products for spacing the same; comprising, in combination,
   (a) a conveyer belt having a continuous motor drive adapted to move said conveyer belt at relatively high speed while carrying thereon said products spaced from each other in a random manner,
   (b) a spacing conveyer located above said conveyer belt and movable at a reduced speed relative to the latter,
   (c) said spacing conveyer carrying equally spaced flight elements, which are arranged for displacement with respect to said spacing conveyer and said conveyer belt and are adapted to cooperate with said products when on said conveyer belt,
   (d) continuous drive means operatively connected to said spacing conveyer and including clutch means for controlling the movement of said spacing conveyer, (e) actuatable means cooperable with said clutch means, (f) respective operable means connected to said flight elements and adapted to move the latter from an inoperative position at first to a semioperative position and finally to a fully operative position, when respective products on said conveyer belt cooperate with and displace corresponding flight elements from said semioperative position, (g) and control means for influencing said actuatable means and disposed at predetermined location above and in the path of respective parts of said operable means when said flight elements remain in said inoperative position and fail to cooperate with respective products thereby to impede movement of said spacing conveyer via said clutch means through said actuatable means.

7. In a spacing system for handling wrapped and unwrapped articles, and similar packages and products of substantially predetermined dimension, which system is equipped with a conveyer belt having a motor drive to move said conveyer belt at relatively high speed and to initially transport said products in a random manner and further with a spacing conveyer having equally spaced flight elements and located above said conveyer belt and movable at a reduced speed relative to the latter, said equally spaced flight elements being arranged for displacement with respect to said spacing conveyer and being adapted to cooperate with said products when on said conveyer belt; the improvement comprising:

(a) continuous drive means connected to said spacing conveyer and including clutch means for controlling movement of said spacing conveyer, (b) actuatable means cooperable with said clutch means, (c) respective operable means operatively connected to said flight elements and adapted to facilitate movement of the latter from an inoperative position at first to a semioperative position, in which respective products on said conveyer belt are adapted to cooperate with said flight elements and displace the latter finally from said semioperative to fully operative position, in which said flight means are located forwardly of the respective products, (d) and control means for influencing said actuatable means and located in the path of a predetermined part of each of said operable means when said flight elements assume said inoperative position and remain free from cooperation with said products, thereby to impede further movement of said spacing conveyer via said actuatable means and said clutch means.

8. In a conveyer system for handling articles to be initially deposited on a conveyer in a random manner, with which predetermined movable flight means are cooperable to be engaged by such articles, so as finally to equally space the latter for group forming, counting, collecting and like purposes; the improvements comprising (a) means actuatable by said predetermined flight means for automatically impeding movement of all flight means, when said predetermined flight means are out of contact with said articles and remain in inoperative position, (b) means releasing one of said predetermined flight means upon displacement thereof from inoperative position to operative position, in which engagement between at least one article and said one predetermined flight means is established, (c) means for resetting said actuatable means for causing resumption of movement of all flight means, (d) means releasing further predetermined flight means upon subsequent engagement thereof by further articles on said conveyer, so that said further articles will be equally spaced with respect to said one article and relative to each other, and (e) means returning said predetermined flight means automatically to inoperative position upon movement to a location remote from said spaced articles on said conveyer.

9. In a conveyer system for handling articles on a conveyer when arranged thereon in a random manner, with which movable flight means are cooperable upon engagement of such articles therewith, thereby to equally space the latter on said conveyer for group forming, counting, collecting and like purposes; the improvements comprising (a) means actuatable by said flight means and arranged at a first location above predetermined flight means and actuatable thereby, when said predetermined flight means are out of contact with said articles and in an inoperative position, thereby to automatically impede further movement of all flight means, (b) means automatically releasing one of said predetermined flight means as the latter is displaced from its inoperative position to an operative position in which engagement between at least one article and said one of said flight means is established, (c) means automatically releasing further predetermined flight means upon subsequent engagement thereof by further articles carried by said conveyer, (d) means resetting said actuatable means and conditioning resumption of movement of said flight means, and (e) means guiding said one and said further flight means to assume automatically inoperative position at a second location remote from said articles on said conveyer.

10. In a conveyer system for handling articles deposited on a conveyer in a random manner, with which movable flight means are cooperable when confronted with such articles on said conveyer during its movement, thereby to equally space the articles for group forming, counting, collecting and like purposes; the improvements comprising (a) means actuatable by article confronting flight means for automatically impeding movement of all flight means, when the confronting flight means are in inoperative position and out of contact with said articles on said conveyer, (b) means automatically releasing one of said confronting flight means upon displacement thereof from inoperative position to operative position, subsequently to engagement by at least one article with said one flight means, (c) means for resetting said actuatable means and for causing resumption of movement of all flight means, and (d) means automatically releasing further article confronting flight means upon subsequent engagement thereof by further articles on said conveyer, so that said further articles will be equally spaced with respect to said one article and relative to each other on said conveyer prior to further handling.

11. A system for handling wrapped and unwrapped articles, packages and similar products for equally spacing the same, which system has a conveyer belt with a continuous motor drive adapted to move said conveyer belt at relatively high speed with said products spaced thereon in a random manner and has further a spacing conveyer arranged for location above said conveyer belt and movable at a reduced speed relative to the latter, which spacing conveyer supports equally spaced flight elements, which are arranged successively for displacement from an inoperative to an operative position with respect to said spacing conveyer and said conveyer belt and for cooperation with said products when placed on said conveyer belt; the improvement comprising:

(a) continuous drive means operatively connected to said spacing conveyer via clutch means for controlling the movement of said spacing conveyer,
(b) solenoid-operated pawl means cooperable with said clutch means to either clutch or declutch said drive means,
(c) respective operable means connected to said flight elements and adapted to move the latter from said inoperative position at first to a semioperative position and then to fully operative position, when products on said conveyer belt come to engage with respective flight elements in said semi-operative position and displace the latter flight means to said fully operative position,
(d) electric switch means disposed at predetermined location and in the path of respective parts of said operable means when said flight elements are in said inoperative position, in which said respective products remain disengaged from said flight elements and said switch means are tripped and actuate said solenoid-operated pawl thereby to impede movement of said spacing conveyer via said clutch means, and
(e) continuously driven resetting means for determining the respective reset point with respect to the sequence of flight elements when again engaged by products transported on said conveyer belt.

12. In a flight conveyer and like spacing system having a chain drive and flights thereon for equidistantly spacing articles when placed on a transporting band; the improvement comprising:
(a) a plurality of mounting plates operatively and equidistantly connected to said chain drive,
(b) cooperable bars movably supported on each mounting plate,
(c) one bar of each mounting plate being provided with a flight element for engaging an article on said transporting band, when said one bar is released from an inoperative position to an operative position, and
(d) actuatable means operatively interconnecting said one bar on one mounting plate with the corresponding one bar on an adjacent and succeeding mounting plate, thereby to maintain said one bar on said latter plate in inoperative position, until the flight element of said one bar of said one mounting plate is engaged in operative position by one of the articles on said transporting band and operates via said actuatable means to release said one bar on said succeeding mounting plate from its inoperative to operative position, so that engagement of the flight element of said last-mentioned bar with another subsequent article on said transporting band is facilitated.

13. In a conveyer and like spacing system having a driven chain and a plurality of flights thereon for equidistantly spacing articles on a transporting band; the improvement comprising:
(a) a plurality of mounting plates equidistantly located to each other and connected to said chain for movement therewith,
(b) a plurality of members pivotally supported on each mounting plate and adapted to cooperate with each other from an inoperative position to an operative position, successively,
(c) one of said members on each mounting plate forming a spacing bar provided with a flight element for engaging an article,
(d) another of said members of each mounting plate forming a latch bar,
(e) the latch bar on one mounting plate being coordinated and linked to the spacing bar on the latter mounting plate and being also operatively connected to the spacing bar on a succeeding mounting plate to normally maintain the last-mentioned spacing bar in inoperative position,
(f) said spacing bar on said one mounting plate upon engagement of its flight element by one of the articles on said transporting band, being displaceable to operative position and operable to pivotally move its coordinated latch bar for release of said spacing bar on said succeeding mounting plate from inoperative to operative position, in which engagement with another of said articles is afforded.

14. In a chain driven spacing conveyer system, which is equipped with a plurality of flights for engaging articles to be spaced on a transporting conveyer band; the combination of a plurality of mounting plates equidistantly connected to the driven chain and movable therewith, with actuatable members accommodated on said mounting plates and pivotally movable with respect to each other from a normally interlocked and inoperative to an operative and released position, so that one article on said conveyer band engages a predetermined one of said actuatable members of one of said mounting plates and initiates a corresponding member on an adjacent and succeeding mounting plate to displace said last-mentioned member from its inoperative to operative position thereby to afford engagement of another article on said conveyer band with said last-mentioned member.

15. In a system according to claim 14, wherein said actuatable members of one mounting plate include a gate forming first bar and a latch forming second bar operatively connected to said first bar, the actuatable members of an adjacent and succeeding mounting plate including a gate forming third bar and a latch forming fourth bar, said second bar being movable to engage and impede movement of said third bar of said succeeding mounting plate as long as said first bar is out of contact with said one article on said conveyer band, whereas when said one article abuts said first bar which is located ahead of said one article, said second bar will trip said third bar for impact by said other article.

16. In a system for equally spacing articles on a movable transporting conveyer to which they are delivered at random; the improvement comprising in combination:
(a) a spacing conveyor mechanism having a driven chain and sprocket means at each end of said mechanism for moving the same by means of said chain,
(b) support plates equidistantly arranged to each other and attached to said chain for movement therewith,
(c) successive gate bar means pivotally arranged on said support plates,
(d) said gate bar means being adapted to swing from an inoperative position on said plates to an operative position for engagement with said articles on said transporting conveyer to equidistantly space said articles and to discharge same at a pedetermined end of said mechanism,
(e) latch means pivotally carried by said plates and constructed for cooperation between preceding gate bar means and succeeding gate bar means, so that, when one of said preceding gate bar means assumes an operative position and engages an article the corresponding latch means is pivotally moved for release from the next succeeding gate bar means and to set the latter for taking up operative position, and
(f) electro-mechanical control means operatively connected to said gate bar means and actuatable to effectuate stoppage of said spacing mechanism with respect to said transporting conveyer when one of said gate bar means fails to be engaged by said article.

17. In a system according to claim 16,
(a) said electro-mechanical control means for said spacing mechanism including rotatable clutch means having a peripheral surface provided with a tooth and operable to connect said chain with its drive and to disconnect the latter from said chain,
(b) pawl means arranged for coaction with said peripheral surface of said clutch means and to disconnect the latter upon engagement of said pawl means with said tooth, (c) first switch means disposed a predetermined distance from the end of said mechanism at which said equidistantly spaced articles are discharged from said transporting conveyer and operable by gate bar means when in inoperative position to urge said pawl means into engagement with said tooth, thereby to stop said mechanism, (d) continuously rotatable cam means provided with a dwell in its peripheral surface, and (e) second switch means operatively connected with said cam means and operable upon contacting said dwell to bring about resetting of said pawl means with respect to said tooth, (f) the peripheral extents of said cam means and of said of said clutch means corresponding to a predetermined number of equidistantly spaced articles on said transporting conveyer for discharge from the latter at said end of said spacing mechanism.

18. Spacing mechanism for equidistantly spacing objects, packages and like articles on a conveyer belt, on which they are initially deposited in haphazard or inconsistently spaced relation to each other, comprising in combination:

(a) an endless spacing conveyer carrying flights located for movement a predetermined distance above said conveyer belt and adapted to cooperate with articles on the latter, so as to equidistantly space said articles from each other on said conveyer belt, (b) rotatably driven mechanical means having a clutch element with an effective surface and a tooth thereon and a continuously driven cam having an effective surface with a dwell therein, said mechanical means further including:

(c) a first member adapted to coact with the flights of said spacing conveyer for controlling its movement, (d) a second member adapted to coact with the surface of said clutch element, (e) a third member adapted to coact with said cam surface, and (f) electrical means arranged for cooperation with said members and including electric circuit means provided with switch means, relay means and solenoid means, (g) one of said switch means being actuatable by said first member when at least one of said flights assumes inoperative position and fails to come in contact with an article on said conveyer belt, thereby to place said relay means and said solenoid means in the circuit means, (h) said second member being actuatable by said solenoid means and contacting said surface of said clutch element for impeding movement thereof upon engagement with said tooth, (i) another of said switch means being operable when said third member engages said cam dwell to open said circuit means thereby to de-energize said solenoid means for deactivation of said second member with respect to said clutch element and to reset the predetermined timed relation between said clutch element and said cam, (k) the respective extent of effective surface of said clutch element and of said cam determining the number of articles for being equidistantly spaced on said conveyer belt to be discharged therefrom.

19. Spacing mechanism according to claim 18, said flights carried by said spacing conveyer comprising:

(a) mounting plate means successively and equidistantly spaced from each other and connected to said spacing conveyer for movement therewith, (b) a plurality of bars pivotally supported on each plate means and adapted to move relative to said plate means from an inoperative position to an operative position, (c) said bars of each plate means including a gate member provided with a flight element at one end, and a latch member operatively connected to said gate member, and (d) respective means on the latch member of a preceding plate means and on the gate member of a succeeding plate means for interconnecting and latching said bars of adjacent plate means with each other in said inoperative position and for releasing said bars of adjacent plate means to said operative position respectively, in which said gate members are swung successively for contact of the respective flight elements with corresponding articles for equidistantly spacing same on said conveyer belt.

20. Spacing mechanism according to claim 19, (a) said means on each latch member being an end of reduced surface and said means on each gate member being in the form of a slit shaped for slidable engagement with said latch member end, (b) said gate members of said plate means being located in inoperative position remote from said conveyer belt and in the path of said first member to operate the latter for controlling the movement of said spacing conveyer.

21. Spacing mechanism according to claim 19, (a) said endless spacing conveyer including sprocket means at opposite ends of said conveyer, (b) chain means trained over and engaged by said sprocket means, (c) each of said gate members being provided at another end opposite said one end with a roller, (d) and cam shaped guide means mounted adjacent said sprocket means and engageable by said rollers of said gate members to successively guide and pivotally move said latch members for interconnecting and latching said gate members in said inoperative position, in which said flight elements are turned away from and located a predetermined distance from said conveyer belt.

22. Spacing mechanism according to claim 21, (a) said plate means forming parts of said chain means and being recessed in the latter, whereby said gate members with said flight elements project beyond said plate means, (b) said flight elements extending at right angles to said gate members and transversely of said conveyer belt.

23. Spacing mechanism according to claim 19, including (a) a plurality of stop pins mounted on each plate means for limiting the movements of respective bars relative to each other and with respect to said plate means during the movement of said spacing conveyer.

References Cited by the Examiner

UNITED STATES PATENTS 3,162,294  12/1964  Dieter _____ 198—34

EVON C. BLUNK, *Primary Examiner.*

RICHARD E. AEGERTER, *Examiner.*